(12) United States Patent
Ternent et al.

(10) Patent No.: US 7,536,281 B2
(45) Date of Patent: May 19, 2009

(54) METHOD FOR COMPENSATING FOR A CONTAMINATED CALIBRATION TARGET USED IN CALIBRATING A SCANNER

(75) Inventors: Alison Beth Ternent, Midway, KY (US); Aditya Jayant Angal, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 11/756,680

(22) Filed: Jun. 1, 2007

(65) Prior Publication Data

US 2008/0300811 A1    Dec. 4, 2008

(51) Int. Cl.
H03F 1/26 (2006.01)
H04N 1/46 (2006.01)

(52) U.S. Cl. ........................ 702/190; 358/504
(58) Field of Classification Search ......... 702/190–195, 702/85, 104; 356/237.1, 244, 402; 382/162–163, 382/167, 312–313, 317–318; 358/501–506, 358/401, 443, 445, 448, 463, 471, 474
See application file for complete search history.

(56) References Cited

U.S. PATENT DOCUMENTS

| | | | | |
|---|---|---|---|---|
| 5,307,175 A * | 4/1994 | Seachman | .................. | 358/401 |
| 5,563,723 A * | 10/1996 | Beaulieu et al. | ............ | 358/461 |
| 6,005,968 A * | 12/1999 | Granger | ...................... | 382/162 |
| 6,035,058 A * | 3/2000 | Savakis et al. | .............. | 382/163 |
| 6,304,826 B1 * | 10/2001 | Liu | ............................ | 702/104 |
| 6,330,078 B1 * | 12/2001 | Wang | ......................... | 358/1.9 |
| 6,459,509 B1 * | 10/2002 | Maciey et al. | ............... | 358/474 |
| 6,518,587 B2 * | 2/2003 | Rombola | ................ | 250/559.1 |
| 6,552,829 B1 * | 4/2003 | Maciey et al. | ............... | 358/509 |
| 6,975,949 B2 * | 12/2005 | Mestha et al. | ................ | 702/76 |
| 7,027,185 B2 * | 4/2006 | Subirada et al. | ............. | 358/1.9 |
| 7,149,002 B2 * | 12/2006 | Clifton | ....................... | 358/474 |
| 7,186,982 B1 * | 3/2007 | Kiser | .................... | 250/363.09 |
| 7,224,484 B1 * | 5/2007 | Reeves et al. | ................ | 358/1.9 |
| 7,251,064 B2 * | 7/2007 | Chiu | ......................... | 358/504 |
| 7,295,703 B2 * | 11/2007 | Bala et al. | .................... | 382/165 |
| 2006/0001921 A1 * | 1/2006 | Bailey et al. | ............... | 358/504 |

* cited by examiner

*Primary Examiner*—Michael P. Nghiem
*Assistant Examiner*—Toan M Le
(74) *Attorney, Agent, or Firm*—Taylor & Aust, PC

(57) ABSTRACT

A method for compensating for a contaminated calibration target used in calibrating a scanner having a plurality of sensor pixels includes (a) scanning a calibration target to generate a respective plurality of calibration data samples for each sensor pixel of the plurality of sensor pixels; (b) for calibration data samples associated with a current sensor pixel of the plurality of sensor pixels, removing any calibration data sample that corresponds to a region of calibration target contamination, leaving filtered calibration data samples; (c) determining a gain value for the current sensor pixel based on the filtered calibration data samples; (d) repeating acts (b) and (c) for a next sensor pixel until a respective gain value is determined for each of the plurality of sensor pixels; and (e) applying the determined gain values to the plurality of sensor pixels for use in subsequent image scanning by the scanner.

23 Claims, 17 Drawing Sheets

METHOD FOR COMPENSATING FOR A CONTAMINATED CALIBRATION TARGET USED IN CALIBRATING A SCANNER

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to scanners and scanning methods, and more particularly to a method for compensating for a contaminated calibration target used in calibrating a scanner.

2. Description of the Related Art

An image scanning system must be calibrated to obtain a usable digital image. Typically, such calibration is accomplished by scanning a target image (also known as a calibration strip) with known optical properties, and adjusting analog and digital gains and offsets for pixels of the scanner so that the final digital output correctly matches the target input. The quality of digital scanned images is directly related to the quality of the calibration. In some instances, the quality of the calibration is compromised by contamination of the target image.

Under ideal conditions, the target image, or calibration strip, would be uniform and neutral. However, in reality even tiny imperfections in the uniformity and/or neutrality of the calibration strip can catastrophically effect the calibration of the image scanning system, and thus adversely affect the reproduction quality of subsequent scanned images. These imperfections can be caused by particulate contamination of the calibration strip, or creases in the calibration strip, or any other phenomenon that will alter the optical properties of the calibration strip. For example, since it is virtually impossible to keep the manufacturing environment perfectly clean, it is reasonable to expect that there will be some amount of particulate impurities in the air that may be deposited on the surface of the calibration strip.

When such contamination of the calibration target image occurs, the gains and offsets calculated for the respective pixels of the scanner during the calibration will be incorrect, thereby resulting in displeasing image artifacts in the final digital image of subsequent scanned images.

SUMMARY OF THE INVENTION

The invention, in one form thereof, is directed to a method for compensating for a contaminated calibration target used in calibrating a scanner having a plurality of sensor pixels. The method includes (a) scanning a calibration target to generate a respective plurality of calibration data samples for each sensor pixel of the plurality of sensor pixels; (b) for the respective plurality of calibration data samples associated with a current sensor pixel of the plurality of sensor pixels, removing any calibration data sample that corresponds to a region of calibration target contamination on the calibration target, leaving filtered calibration data samples; (c) determining a gain value for the current sensor pixel based on the filtered calibration data samples; (d) repeating acts (b) and (c) for a next sensor pixel of the plurality of sensor pixels until a respective gain value is determined for each of the plurality of sensor pixels; and (e) applying the determined gain values to the plurality of sensor pixels for use in subsequent image scanning by the scanner.

The invention, in another form thereof, is directed to a method for compensating for a contaminated calibration target used in calibrating a scanner having a plurality of sensor pixels. The method includes (a) scanning a calibration target to generate a respective plurality of calibration data samples for each sensor pixel of the plurality of sensor pixels; (b) processing the respective plurality of calibration data samples associated with a current sensor pixel of the plurality of sensor pixels to determine whether there is a region of calibration target contamination associated with the current sensor pixel; (c) filtering the respective plurality of calibration data samples to remove any calibration data sample corresponding to the region of calibration target contamination, leaving filtered calibration data samples; (d) determining a gain value for the current sensor pixel based on the filtered calibration data samples; (e) repeating acts (b) through (d) for a next sensor pixel of the sensor pixels until a respective gain value is determined for each of the plurality of sensor pixels; and (f) applying the determined gain values to the plurality of sensor pixels for use in subsequent image scanning by the scanner.

The invention, in another form thereof, is directed to a method for compensating for a contaminated calibration target used in calibrating a scanner having a plurality of sensor pixels. The method includes (a) scanning a calibration target to generate a respective plurality of calibration data samples for each sensor pixel of the plurality of sensor pixels; (b) determining a maximum calibration value of the respective plurality of calibration data samples associated with a current pixel of the plurality of sensor pixels; (c) determining a minimum calibration value of the respective plurality of calibration data samples associated with the current pixel; (d) determining an average calibration value of the respective plurality of calibration data samples associated with the current pixel; (e) determining a first difference between the average calibration value and the minimum calibration value; (f) determining a second difference between the average calibration value and the maximum calibration value; (g) forming a first ratio of the first difference and the second difference, and if the first ratio exceeds a first predetermined threshold, then designating the calibration target as having a region of calibration target contamination associated with the current pixel; (h) determining a third difference between a current calibration value of a current calibration sample of the respective plurality of calibration data samples and the minimum calibration value; (i) forming a second ratio of the third difference and the first difference, and if the second ratio is less than a second predetermined threshold, then designating the current calibration value as corresponding to the region of calibration target contamination; (j) repeating acts (h) and (i) for each calibration data sample of the respective plurality of calibration data samples for the current sensor pixel; (k) removing any calibration data sample corresponding to the region of calibration target contamination, leaving filtered calibration data samples; (l) forming a new average calibration value from the filtered calibration data samples; (m) determining a gain value for the current sensor pixel based on the new average calibration value for the current pixel; (n)

repeating acts (b) through (m) for a next sensor pixel of the plurality of sensor pixels until a respective gain value is determined for each of the plurality of sensor pixels; and (o) applying the determined gain values to the plurality of sensor pixels for use in subsequent image scanning by the scanner.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
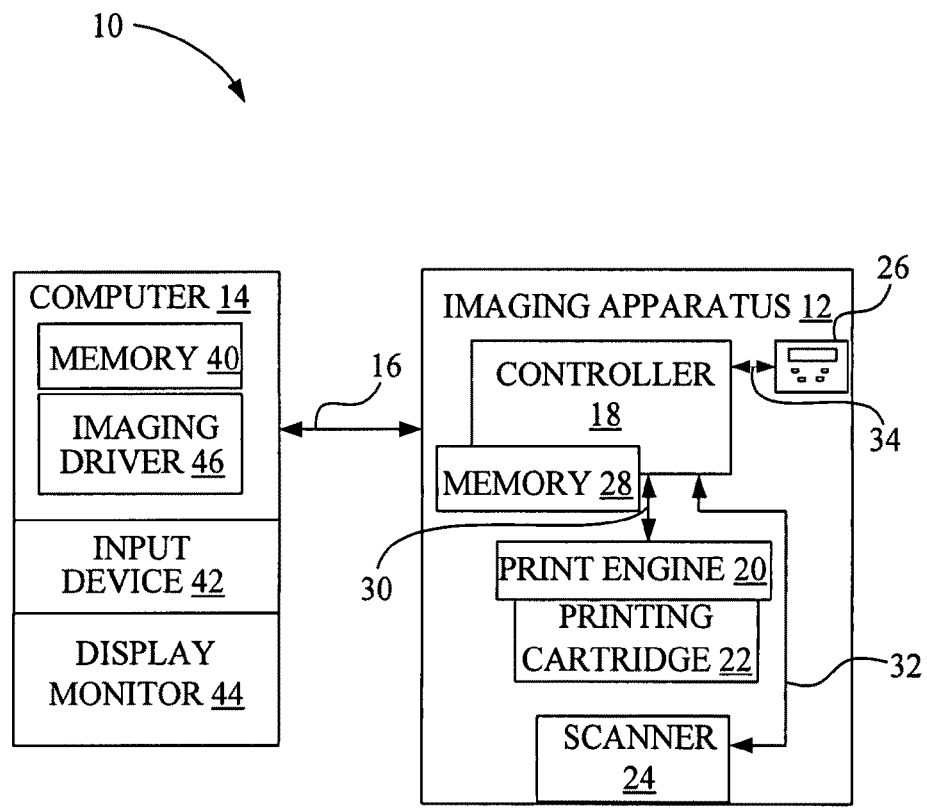
FIG. 1 is a diagrammatic depiction of an exemplary imaging system embodying the present invention, having an imaging apparatus.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components, may be utilized to implement the invention. Furthermore, and as described in subsequent paragraphs, the specific mechanical configurations illustrated in the drawings are intended to exemplify embodiments of the invention and other alternative mechanical configurations are possible.

Referring now to the drawings and particularly to FIG. 1, there is shown a diagrammatic depiction of an imaging system 10 embodying the present invention. As shown, imaging system 10 may include an imaging apparatus 12 and a computer 14. Imaging apparatus 12 communicates with computer 14 via a communications link 16. As used herein, the term "communications link" is used to generally refer to structure that facilitates electronic communication between multiple components, and may operate using wired or wireless technology. Imaging system 10 may be, for example, a customer imaging system, or alternatively, a development tool used in imaging apparatus design.

In the embodiment shown in FIG. 1, imaging apparatus 12 is shown as a multifunction machine that includes a controller 18, a print engine 20, a printing cartridge 22, a scanner 24, and a user interface 26. Imaging apparatus 12 may communicate with computer 14 via a standard communication protocol, such as for example, universal serial bus (USB), Ethernet or IEEE 802.1x. A multifunction machine is also sometimes referred to in the art as an all-in-one (AIO) unit. Those skilled in the art will recognize that imaging apparatus 12 may be, for example, an ink jet printer/copier; an electrophotographic printer/copier; a thermal transfer printer/copier; other mechanism including at least scanner 24; or a standalone scanner 24.

Controller 18 includes a processor unit and associated memory 28, and may be formed as one or more Application Specific Integrated Circuits (ASIC). Memory 28 may be, for example, random access memory (RAM), read only memory (ROM), and/or non-volatile RAM (NVRAM). Alternatively, memory 28 may be in the form of a separate electronic memory (e.g., RAM, ROM, and/or NVRAM), a hard drive, a CD or DVD drive, or any memory device convenient for use with controller 18. Controller 18 may be, for example, a combined printer and scanner controller.

In the present embodiment, controller 18 communicates with print engine 20 via a communications link 30. Controller 18 communicates with scanner 24 via a communications link 32. User interface 26 is communicatively coupled to controller 18 via a communications link 34. Controller 18 serves to process print data and to operate print engine 20 during printing, as well as to operate scanner 24 and process data obtained via scanner 24. In addition, controller 18 may operate scanner 24 in accordance with the present invention to implement a method for compensating for a contaminated calibration target used in calibrating scanner 24.

Computer 14, which may be optional, may be, for example, a personal computer, including memory 40, such as RAM, ROM, and/or NVRAM, an input device 42, such as a keyboard, and a display monitor 44. Computer 14 further includes a processor, input/output (I/O) interfaces, and may include at least one mass data storage device, such as a hard drive, a CD-ROM and/or a DVD unit.

Computer 14 includes in its memory a software program including program instructions that function as an imaging driver 46, e.g., printer/scanner driver software, for imaging apparatus 12. Imaging driver 46 is in communication with controller 18 of imaging apparatus 12 via communications link 16. Imaging driver 46 facilitates communication between imaging apparatus 12 and computer 14. One aspect of imaging driver 46 may be, for example, to provide formatted print data to imaging apparatus 12, and more particularly, to print engine 20, to print an image. Another aspect of imaging driver 46 may be, for example, to facilitate collection of scanned data. Still another aspect of imaging driver 46 may be, for example, to facilitate calibration of scanner 24.

In some circumstances, it may be desirable to operate imaging apparatus 12 in a standalone mode. In the standalone mode, imaging apparatus 12 is capable of functioning without computer 14. Accordingly, all or a portion of imaging driver 46, or a similar driver, may be located in controller 18 of imaging apparatus 12 so as to accommodate printing and scanning functionality when operating in the standalone mode.

Figure 2:
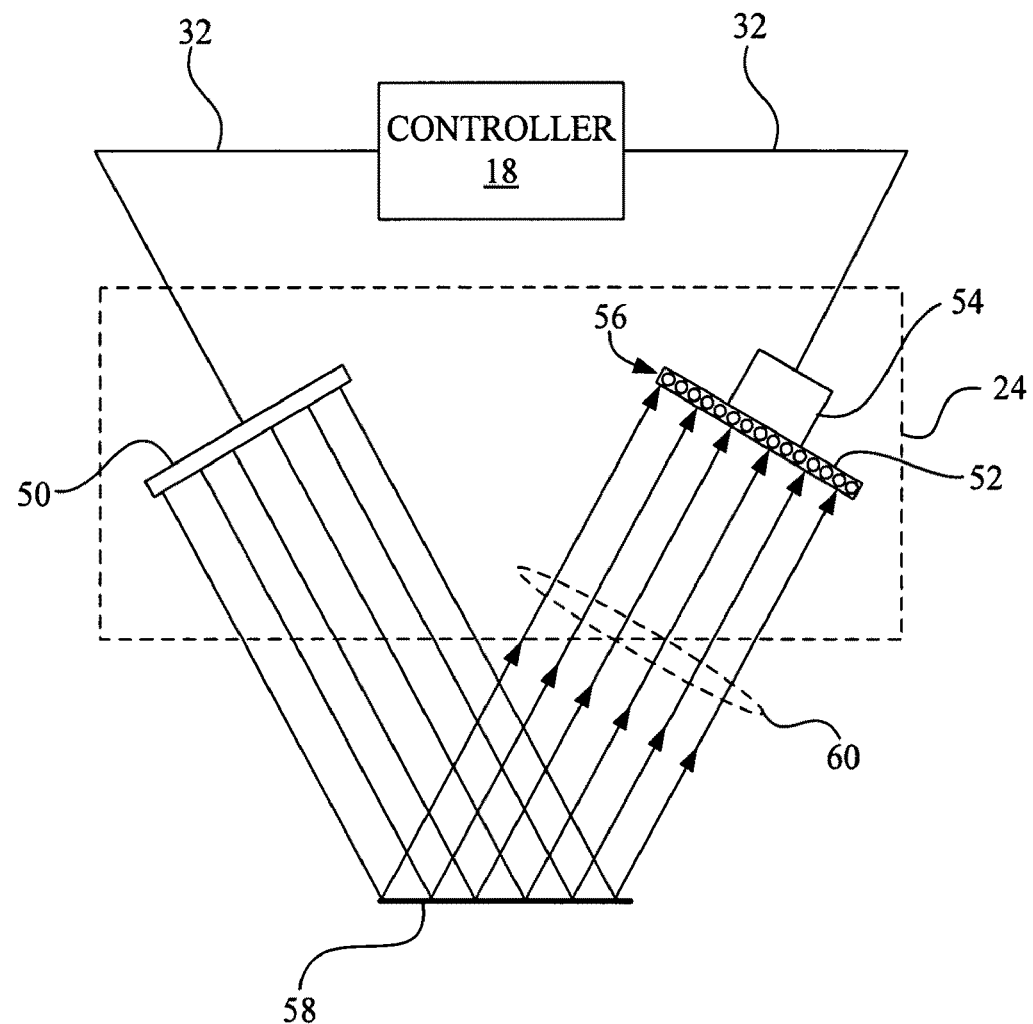
FIG. 2 is a diagrammatic depiction of the scanner in the imaging apparatus of FIG. 1.

Referring to FIG. 2, scanner 24 includes a light source 50 and an image sensor 52, e.g., a scan bar. Associated with image sensor 52 is a pixel gain/offset circuit 54. Those skilled in the art will recognize that scanner 24 may include other signal processing and/or generation circuitry not shown in FIG. 2. Scanner 24 may be of a conventional scanner type, such as for example, a sheet feed or flat bed scanner. In the context of the present invention, either scanner type may be used. As is known in the art, a sheet feed scanner transports a document to be scanned past a stationary sensor device, whereas a flatbed scanner transports a movable scan bar (i.e., sensor device) over a stationary document.

Light source 50 may be, for example, a florescent bulb, or one or more light emitting diodes (LEDs). Image sensor 52 includes a plurality of light sensing elements, which will be referred to herein as sensor pixels 56, which may be formed in a linear array. A signal output of each sensor pixel of the sensor pixels 56 is individually read and processed by pixel gain/offset circuit 54. The gain and/or offset for each pixel of the plurality of sensor pixels 56 is set during a calibration of scanner 24 by pixel gain/offset circuit 54. Image sensor 52 may be, for example, an optical reduction module or a Contact Image Sensors (CIS) array.

The optical reduction module is a collection of tiny, light-sensitive diodes, which convert photons into electrons. These diodes are called photo sites, or photodiodes. The more photons that are captured by a single photo site, the greater the electrical charge that will accumulate at that site. The image of the document that is scanned using light source 50 reaches the optical reduction module through a series of mirrors, filters and lenses. The exact configuration of these components will depend on the model of scanner. Most optical reduction scanners use a single pass method, wherein the lens focuses the image onto three color filtered sensors. The scanner software assembles the three filtered images into a single full-color image.

In the CIS array, both light source 50 and image sensor 52 are included in a scan bar, which is typically used for example in inexpensive flatbed scanners. The CIS array includes an array of red, green and blue light emitting diodes (LEDs) and a corresponding array of phototransistors, or photodiodes. The image sensor array consisting of 600, 1200, 2400 or 4800 LEDs and phototransistors, or photodiodes, per inch (depending on resolution) spans the width of the scan area and is placed very close to the glass plate upon which rest the image to be scanned. Another version of the CIS used a single set of red, green and blue LEDS in combination with light pipes to provide illumination of the material to be scanned. When the image is scanned, the LEDs combine to provide a white light source. The illuminated image is then captured by the row of sensors. CIS scanners are cheaper, lighter and thinner, but may not provide the same level of quality and resolution found in most optical reduction scanners. Color scanning is done by illuminating each color type of LED separately and then combining the three scans.

A calibration target 58 is used during the calibration of scanner 24. Calibration target 58 may be, for example, in a form of a strip that extends the length of image sensor 52. Calibration target 58 ideally has a single uniform neutral tone (uniform optical density), as illustrated in FIG. 3. The uniform neutral tone of calibration target 58 may be, for example, described as luminance $L^* > T_L$ and chrominance $a^* \& b^* < T_{ab}$ as defined in CIELAB color space, where $T_L$ and $T_{ab}$ are predetermined thresholds. In the CIELAB color space system, which is device-independent, $L^*$ is a luminance (lightness) component, and $a^*$ and $b^*$ are chrominance components. In the arrangement shown in FIG. 2, light supplied by light source 50 is reflected off of calibration target 58, and the reflected light 60 is received by the plurality of sensor pixels 56 of image sensor 52.

Figure 3A:
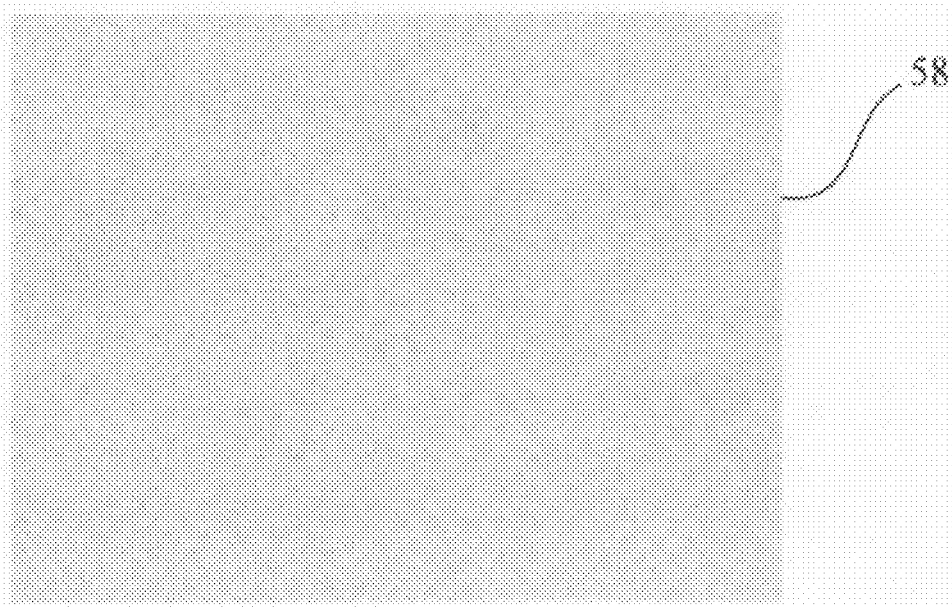
FIG. 3A is a diagrammatic depiction of an ideal calibration target having a uniform neutral tone.
Figure 3B:
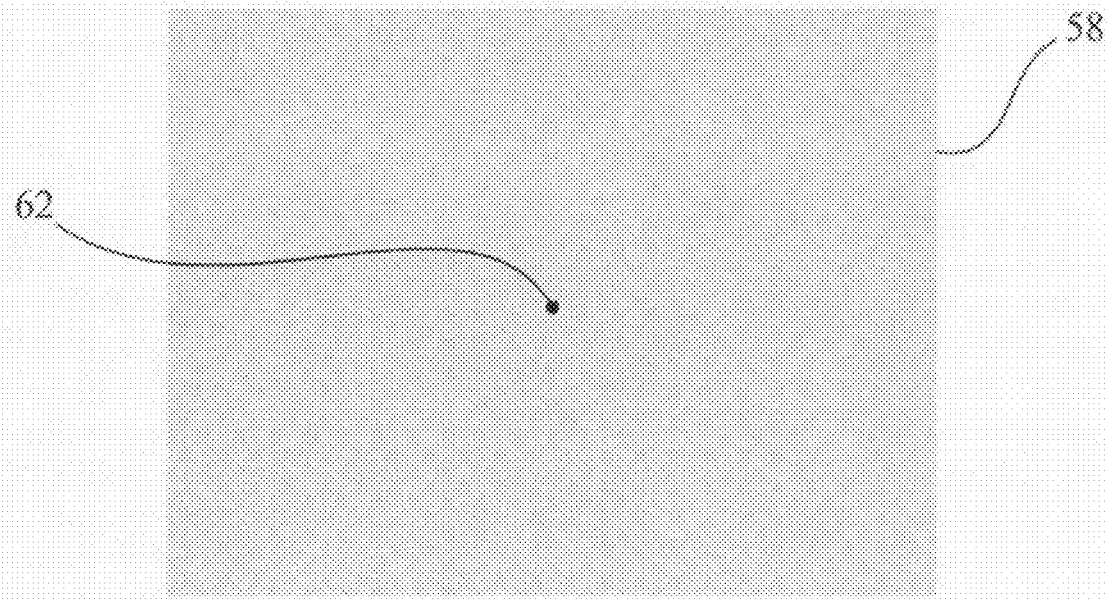
FIG. 3B is a diagrammatic depiction of the calibration target of FIG. 3A affected by a region of calibration target contamination.

In contrast to FIG. 3A, FIG. 3B shows calibration target 58 affected by a region of calibration target contamination 62. The region of calibration target contamination 62 may be quite small, e.g., about 0.1 millimeters in diameter. The region of calibration target contamination 62 may be caused, for example, by a particle of dust adhering to the surface of calibration target 58, an image imperfection in calibration target 58, or a scratch of calibration target 58.

Figure 4:
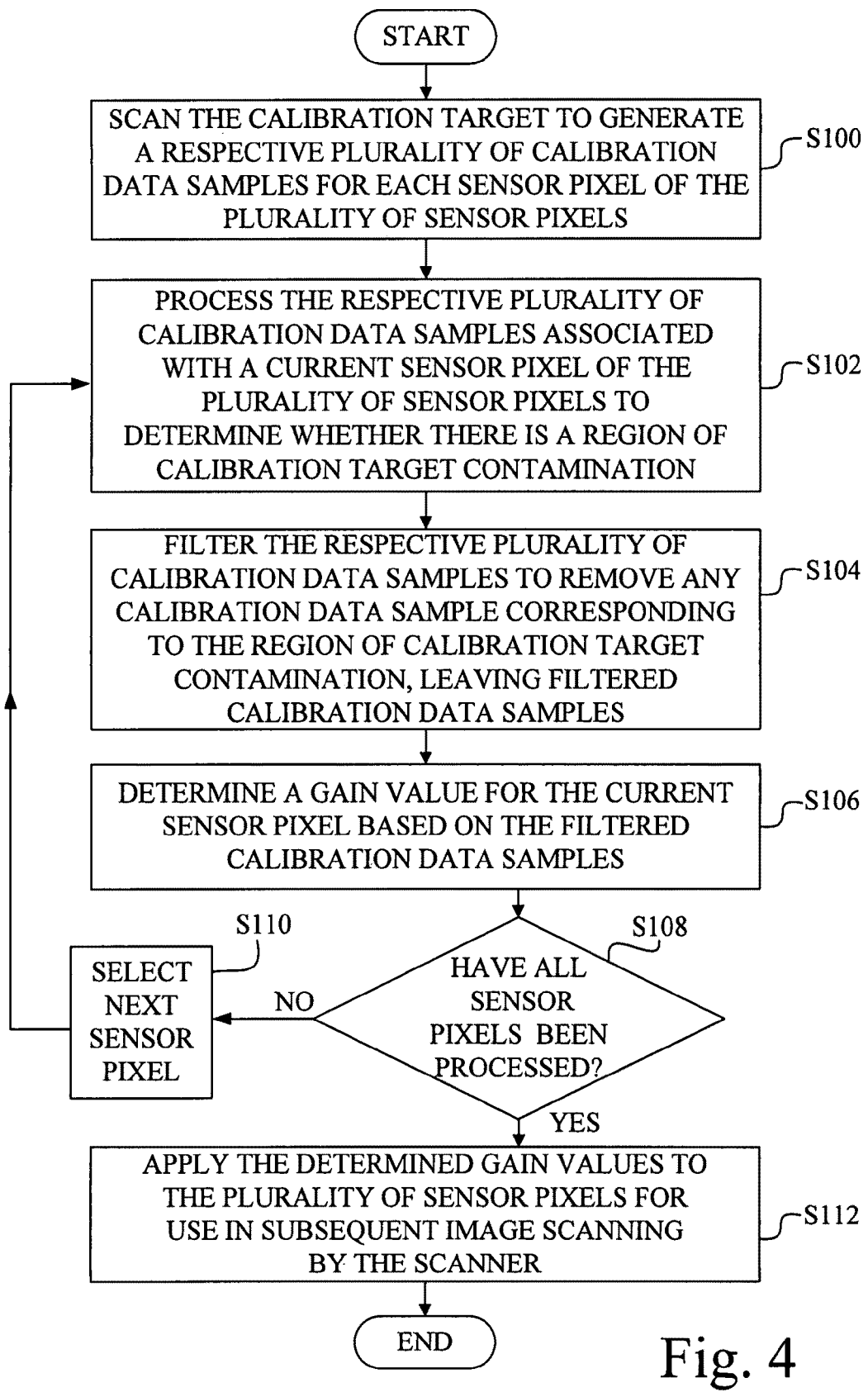
FIG. 4 is a flowchart of a method for compensating for a contaminated calibration target used in calibrating a scanner, in accordance with an embodiment of the present invention.

FIG. 4 is a flowchart of a method for compensating for a contaminated calibration target used in calibrating a scanner having a plurality of sensor pixels, such as scanner 24, in accordance with an embodiment of the present invention. The method may be carried out, for example, as program instructions executed by imaging system 10, and more particularly, by controller 18 of imaging apparatus 12 and/or by an alternative processing device, such as computer 14.

At act S100, and referring also to FIGS. 3A and 3B, a calibration target, such as calibration target 58, is scanned to generate a respective plurality of calibration data samples for each sensor pixel of the plurality of sensor pixels 56 (see FIG. 2). Values associated with the plurality of calibration data samples may be stored, for example, in memory 28 of imaging apparatus 12, or in memory 40 of computer 14 (see FIG. 1).

Figure 5:
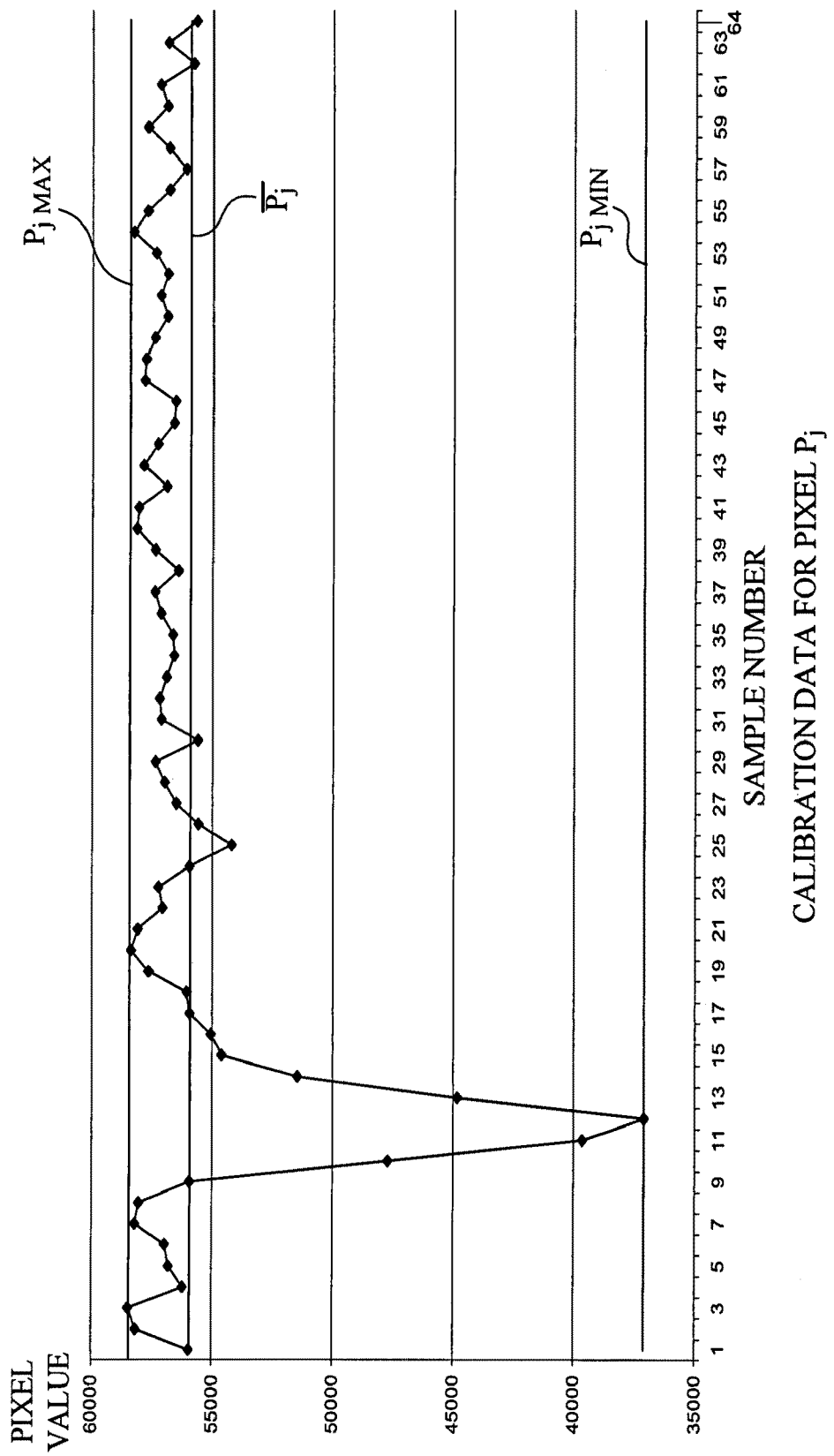
FIG. 5 is a graph showing exemplary pixel values for calibration data samples, sample numbers 1 through 64, for an exemplary pixel of the plurality of sensor pixels of the scanner of the imaging apparatus of FIG. 1, wherein the exemplary pixel corresponds to a region of calibration target contamination on the calibration target.

FIG. 5 is a graph showing exemplary pixel values for calibration data samples, sample numbers 1 through 64, for an exemplary pixel Pj of the plurality of sensor pixels 56 taken in association with calibration target 58 of FIG. 3B. In the example of FIG. 5, the pixel values may range from 35,000 to 60,000. Actual data points for the respective samples 1-64 are shown by diamond-shaped dots.

At act S102, the respective plurality of calibration data samples associated with a current sensor pixel of the plurality of sensor pixels 56 is processed to determine whether there is a region of calibration target contamination, e.g., region of calibration target contamination 62, associated with the current sensor pixel Pj. A calibration target without any contamination, i.e., an ideal calibration target, has a uniform neutral tone as illustrated in FIG. 3A. However, the calibration target, e.g., calibration target 58, may include region of calibration target contamination 62, as illustrated in FIG. 3B. The region of calibration target contamination 62 includes at least one imperfection in at least one of uniformity and neutrality of the calibration target, such as surface contamination (e.g., dust) or embedded contamination (e.g., part of the target image).

At act S104, the respective plurality of calibration data samples is filtered to remove any calibration data sample corresponding to the region of calibration target contamination 62, leaving filtered calibration data samples.

The number of data points in a set of calibration data that may be excluded due to contamination may be limited, if desired, in order to preserve the robustness of the calibration. It may be desirable for such a limit to retain enough data points (e.g., 90 percent) to achieve a statistically significant calibration value. Also, it is to be understood that such a limit affects the total contaminated area per pixel that is allowed to be on calibration target 58 and consequently removed by the current method.

At act S106, a gain value for the current sensor pixel is determined based on the filtered calibration data samples. For example, the gain for the current sensor pixel Pj of the plurality of sensor pixels 56 may be determined from a lookup table utilized by controller 18, which in turn may be utilized by pixel gain/offset circuit 54.

At act S108, it is determined whether all sensor pixels of the plurality of sensor pixels 56 have been processed.

If the determination at act S108 is NO, then the process proceeds to act S110, wherein a next sensor pixel of the plurality of sensor pixels is selected as the current sensor pixel, and acts S102 through S108 are repeated for each sensor pixel of the plurality of sensor pixels until a respective gain value is determined for each of the plurality of sensor pixels.

If the determination at act S108 is YES, then the process proceeds to act S112.

At act S112, the determined gain values are applied to the plurality of sensor pixels for use in subsequent image scanning by scanner 24. For example, the determined gain values may be applied to pixel gain/offset circuit 54 for use in calibrating the respective outputs of the plurality of sensor pixels 56 of image sensor 52 of scanner 24.

Figure 6:
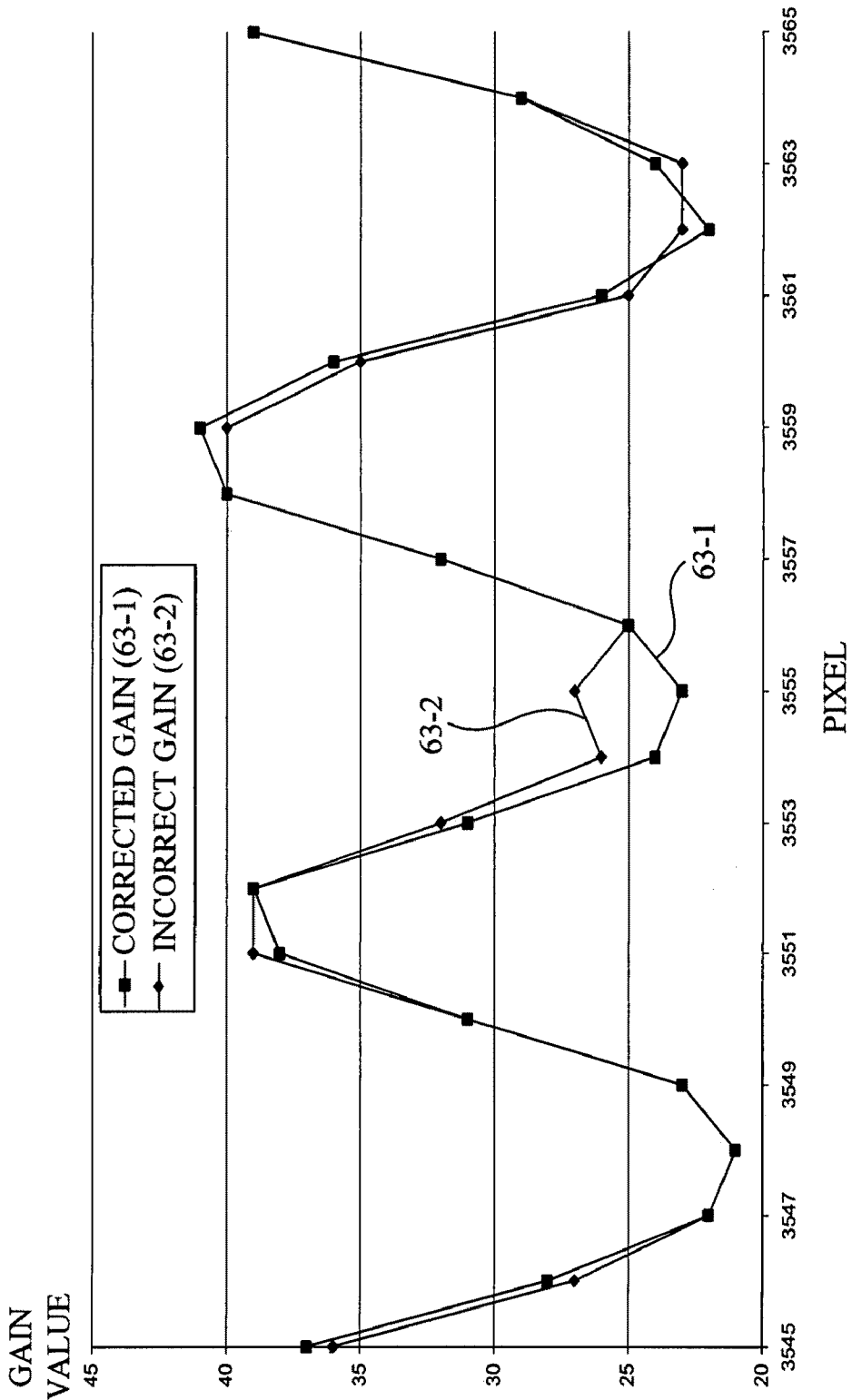
FIG. 6 is a exemplary plot of the pixel gain values associated with a portion of the plurality of sensor pixels of the scanner of the imaging apparatus of FIG. 1.

FIG. 6 is an exemplary plot of the pixel gain values associated with a portion, e.g., pixel 3545 through pixel 3565, of the plurality of sensor pixels 56 of image sensor 52 of scanner 24. In particular, FIG. 6 shows a comparison between a graph 63-1 of the actual pixel gain values that were calculated based on the compensation for a contaminated calibration target provided in accordance with the present invention, and a graph 63-2 of the actual pixel gain values that were calculated without compensation. In other words, the graph 63-1 represent the correct gain values determined based on filtered calibration data samples, and the graph 63-2 represent the incorrect gain values determined based on non-filtered calibration data samples.

Figure 7A:
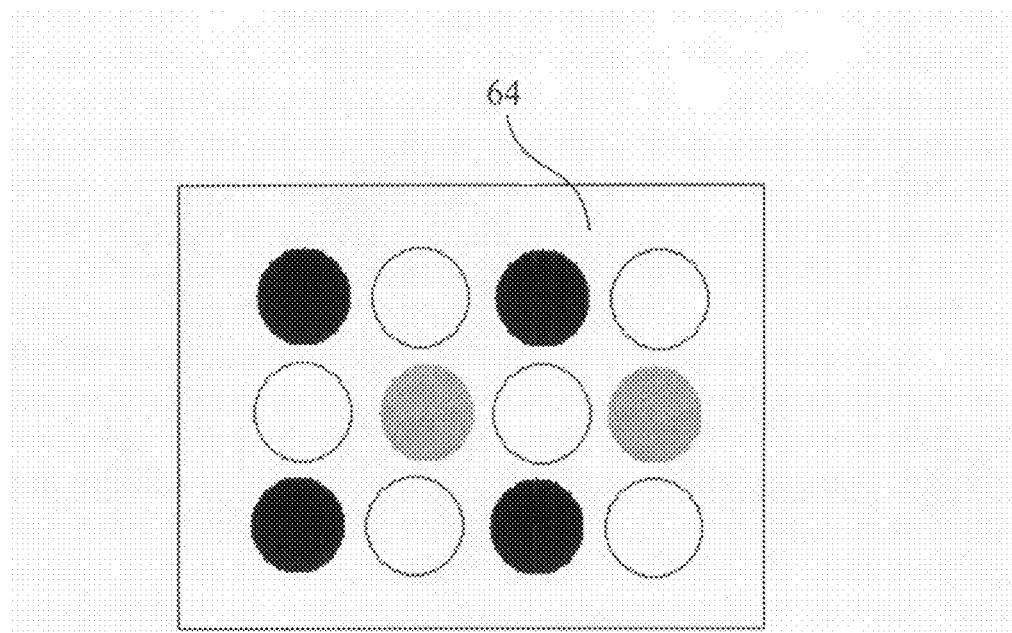
FIG. 7A is pictorial depiction of a portion of a scanned image generated after calibration of the scanner using the method of FIG. 4 in accordance with the present invention.
Figure 7B:
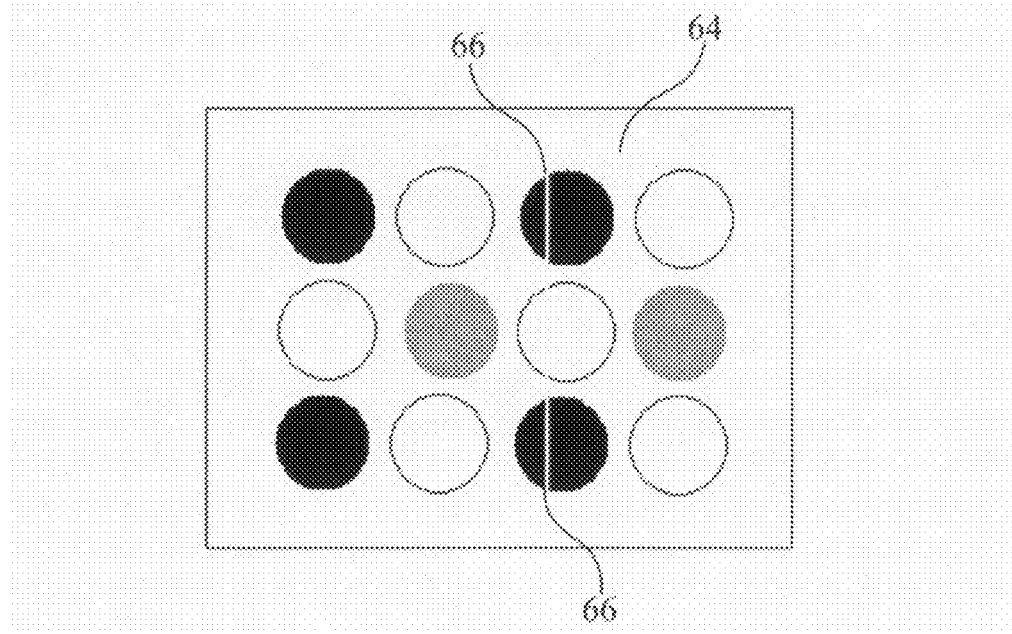
FIG. 7B is a pictorial depiction of the same portion of the scanned image illustrated in FIG. 7A, but generated without using the method of FIG. 4.

Also, FIG. 7A is a pictorial depiction of a portion of a scanned image 64 generated after calibration of scanner 24 using the method of the present invention, and FIG. 7B is a pictorial depiction of the portion of the same scanned image 64 generated without application of the method of the present. In FIG. 7B, a particular sensor pixel Pj calibrated using calibration target 58 having a corresponding region of calibration target contamination 62 results in an undesirable vertical line artifact 66 (represented by the white vertical line), whereas in FIG. 7A the vertical line artifact 66 is not present.

Figure 8:
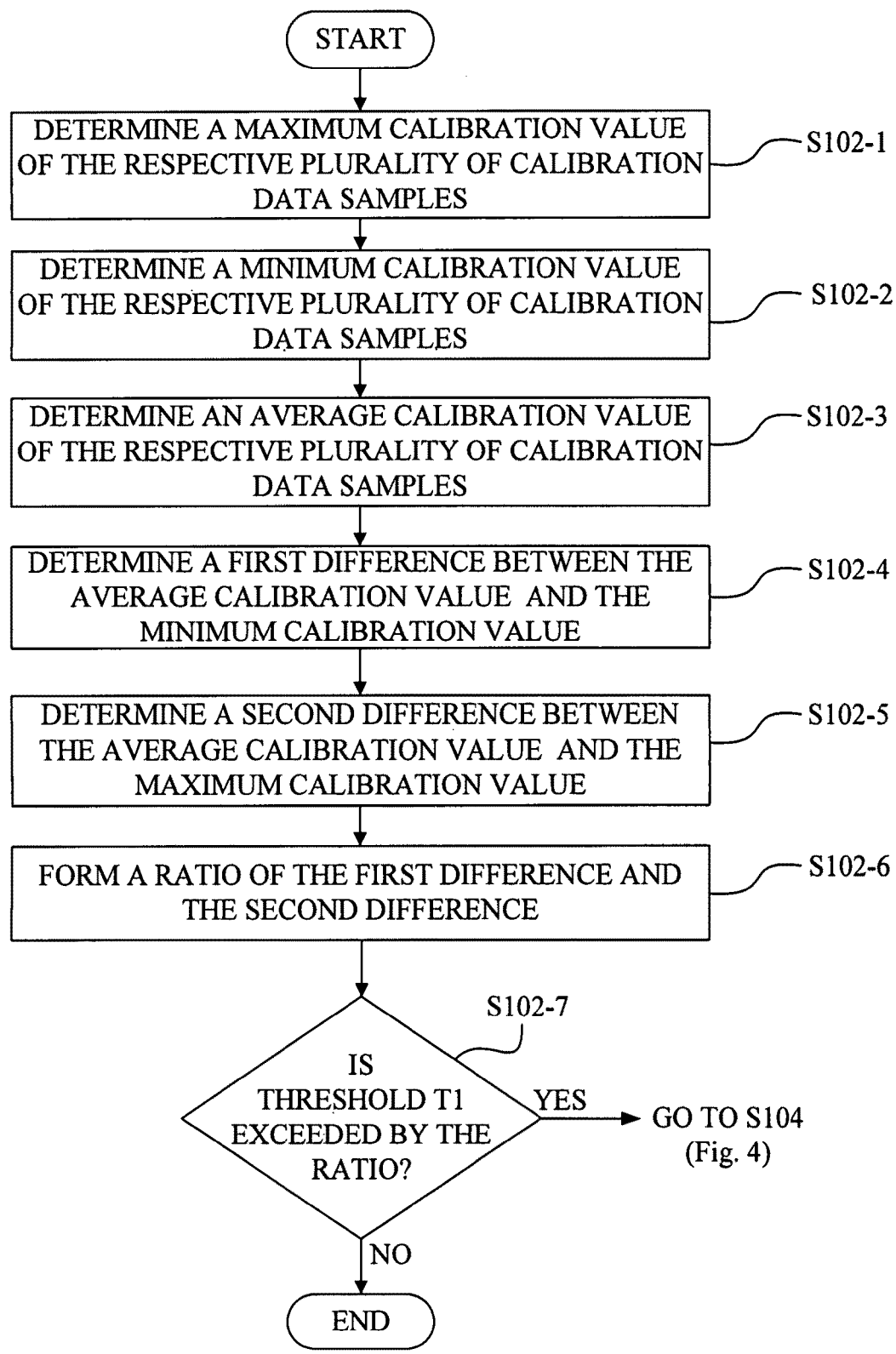
FIG. 8 is a flowchart detailing an embodiment for performing the processing of act S102 of the method of FIG. 4.

FIG. 8 is a flowchart detailing an embodiment for performing the processing of act S102 for a sensor pixel $P_j$.

At act S102-1, a maximum calibration value $P_{j\ max}$ of the respective plurality of calibration data samples is determined.

At act S102-2, a minimum calibration value $P_{j\ min}$ of the respective plurality of calibration data samples is determined.

At act S102-3, an average calibration value $\overline{P}_j$ of the respective plurality of calibration data samples is determined.

At act S102-4, a first difference between the average calibration value $\overline{P}_j$ and the minimum calibration value $P_{j\ min}$ is determined.

At act S102-5, a second difference (absolute value) between the average calibration value $\overline{P}_j$ and the maximum calibration value $P_{j\ max}$ is determined.

At act S102-6, a ratio of the first difference and the second difference is formed.

At act S102-7, it is determined whether a predetermined threshold $T_1$ has been exceeded by the ratio of the first difference and the second difference. If the ratio exceeds the predetermined threshold $T_1$, then the calibration target 58 is designated as having the region of calibration target contamination 62, and the process proceeds to act S104 (see FIG. 4). If not, then calibration target 58 is designated as not having a region of calibration target contamination, and the process ends.

The predetermined threshold $T_1$ may be a constant empirically derived threshold. For example, threshold $T_1$ may be determined by examining the type of imperfection desired to be removed, and its effect on the calibration data average. Equation 1, as follows, is an exemplary calculation that may be used in performing acts S102-4 through S102-7.

$$\left|1 - \frac{\overline{P}_j - P_{jmin}}{|\overline{P}_j - P_{jmax}|}\right| > T_1, \quad \text{Equation 1}$$

where $T_1$=a constant emperically derived threshold, wherein:

$$\overline{P}_j = \frac{\sum_{i=1}^{N} P_{ji}}{N},$$

where $P_{ji}$=the calibration data from pixel j, and sample i, $P_{j\ max}$=max[$P_{ji}$], where $P_{ji}$=the calibration data from pixel j, and sample i, and $P_{j\ min}$=min[$P_{ji}$], where $P_{ji}$=the calibration data from pixel j, and sample i.

In Equation 1, the numerator accounts for high spatial frequency variation in the calibration data, negative with respect to the average with a positive threshold $T_1$, while the denominator accounts for the uniformly distributed random noise in the data. Also, it can be seen in Equation 1 that if the calculated value exceeds threshold $T_1$, then the set of calibration data for pixel j: Pj, is determined to bear the negative influence of calibration strip contamination.

Figure 9:
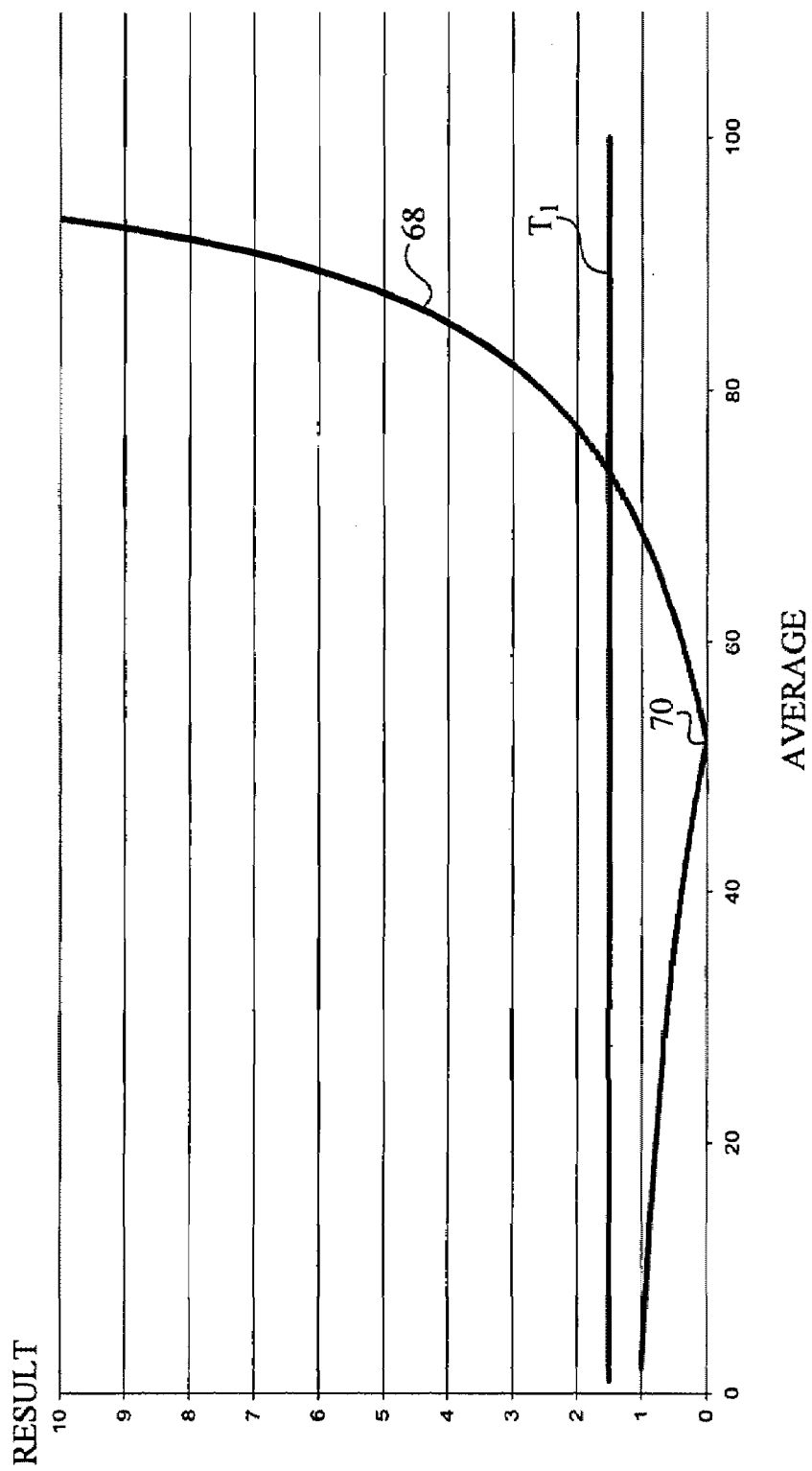
FIG. 9 shows a line plot depicting the result of the left side of Equation 1 as a function of the average calibration value.

FIG. 9 shows a line plot 68 depicting the result of the left side of Equation 1 as a function of the average calibration value $\overline{P}_j$, as it moves from very close to the minimum calibration value $P_{j\,min}$ to very close to the maximum calibration value $P_{j\,max}$. In the example of FIG. 9, the inflection point 70 at (55, 0) represents an average that is also the median. In practice, due to an assumption that all contamination of calibration target 58 will result in a negative variation with respect to the average, i.e., the assumption being that the image of the calibration target 58 will be made to appear darker rather than brighter, the domain will encompass all values from the inflection point and greater, and will exclude all values less than the inflection point. By comparing the averages in uncontaminated calibration data sets to those containing contamination, how far the average is skewed by the contamination can be determined. This will set the threshold T1. For example, assume exemplary present data sets yield an average that was skewed by 24 points. The result value for threshold $T_1$ is the point on the curve corresponding to Average=74 (i.e., 50+24), which is approximately 1.5.

In order to reduce the complexity of the calculation of Equation 1 for implementation into the firmware of scanner 24, e.g., in controller 18, a simplified alternate equation, Equation $1_{alt}$, may be used, as follows:

$$\frac{\overline{P}_j - P_{jmin}}{P_{jmax} - \overline{P}_j} > T_2, \qquad \text{Equation } 1_{alt}$$

where $T_2$=a constant emperically derived threshold.

In Equation $1_{alt}$, the constant value of "1" on the left side of Equation 1 has been absorbed into alternative threshold $T_2$. It should also be noted that the inflection point 70 of FIG. 9 is not preserved as Equation 1 is simplified to Equation $1_{alt}$; however, in this case only values greater than the inflection point 70 are relevant for calculating threshold T2.

Figure 10A:
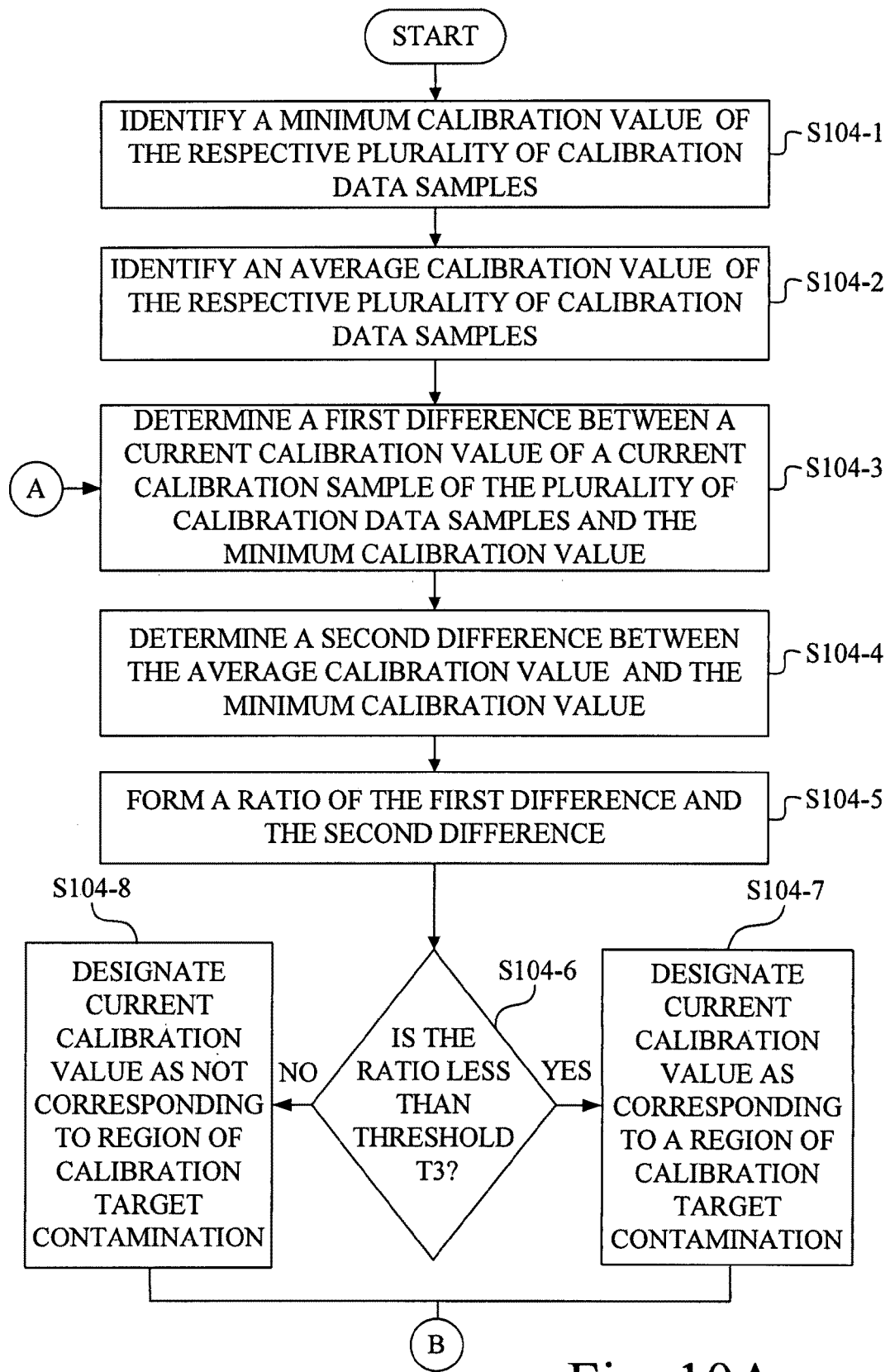
FIGS. 10A and 10B form a flowchart detailing an embodiment for performing the filtering of act S104 of the method of FIG. 4.
Figure 10B:
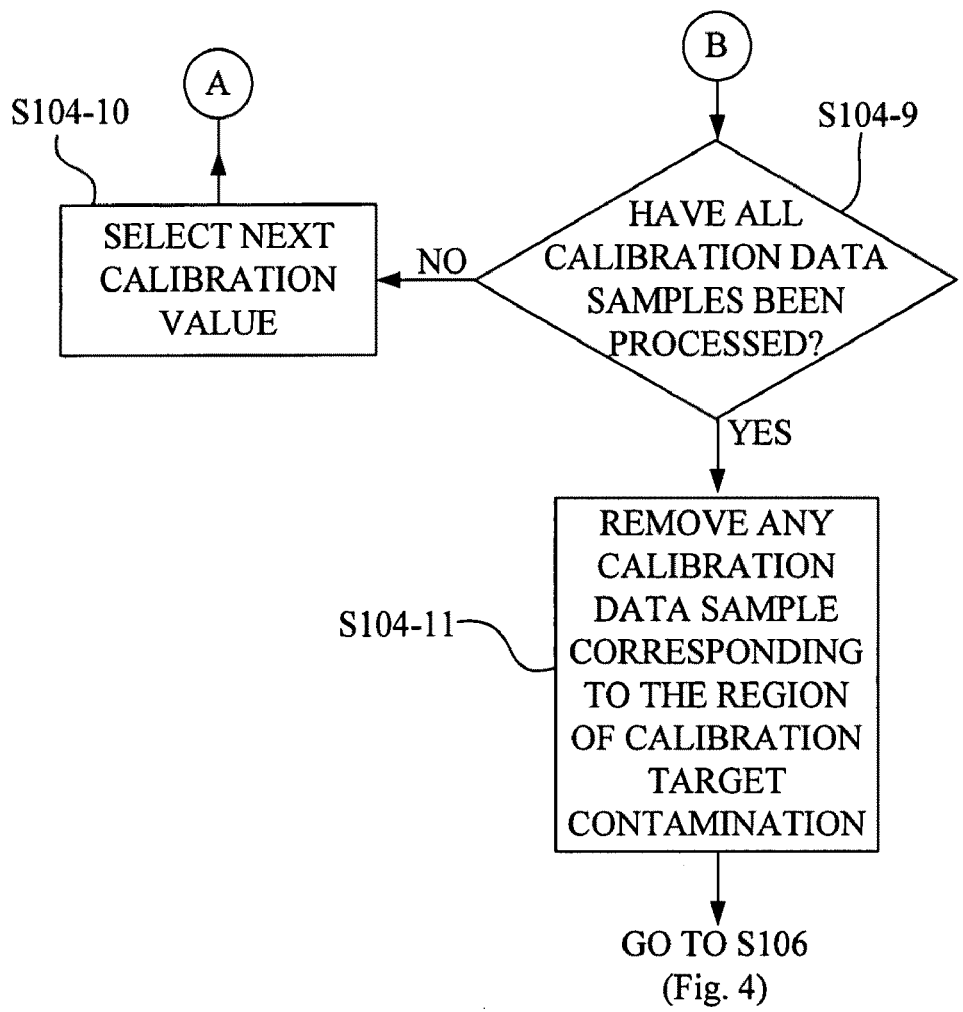

FIGS. 10A and 10B form a flowchart detailing an embodiment for performing the filtering of act S104 for a sensor pixel $P_j$.

At act S104-1, a minimum calibration value $P_{j\,min}$ of the respective plurality of calibration data samples is identified.

At act S104-2, an average calibration value $\overline{P}_j$ of the respective plurality of calibration data samples is identified.

At act S104-3, a first difference between a current calibration value $P_{ji}$ of a current calibration sample of the plurality of calibration data samples and the minimum calibration value $P_{j\,min}$ is determined.

At act S104-4, a second difference between the average calibration value $\overline{P}_j$ and the minimum calibration value $P_{j\,min}$ is determined.

At act S104-5, a ratio of the first difference and the second difference is formed.

At act S104-6, it is determined whether the ratio is less than a predetermined threshold $T_3$. If the ratio is less than the predetermined threshold $T_3$, then at act S104-7 the current calibration value $P_{ji}$ is designated as corresponding to the region of calibration target contamination 62. If the ratio is not less than the predetermined threshold $T_3$, then at act S104-8 the current calibration value $P_{ji}$ is designated as not corresponding to a region of calibration target contamination.

At act S104-9, it is determined whether all calibration data samples of the respective plurality of calibration data samples have been processed.

If the determination at act S104-9 is NO, then the process proceeds to act S104-10 where a next calibration value corresponding to the next calibration sample is selected for processing as the current calibration value $P_{ji}$ and acts S104-3 through S104-9 are repeated.

If the determination at act S104-9 is YES, then the process proceeds to act S104-11.

At act S104-11, any calibration data sample corresponding to the region of calibration target contamination 62 is removed, leaving filtered calibration data samples.

The process then proceeds at act S106 (see FIG. 4).

Equation 2, as follows, is an exemplary calculation that may be used in performing acts S102-4 through S104-6:

$$\frac{P_{ji} - P_{jmin}}{\overline{P}_j - P_{jmin}} < T_3, \qquad \text{Equation 2}$$

where $T_3$=a constant emperically derived threshold.

By examining Equation 2, it can be seen that if the calculated value is less than threshold $T_3$, then the current calibration value $P_{ji}$, is determined to bear the negative influence of calibration target contamination.

Figure 11:
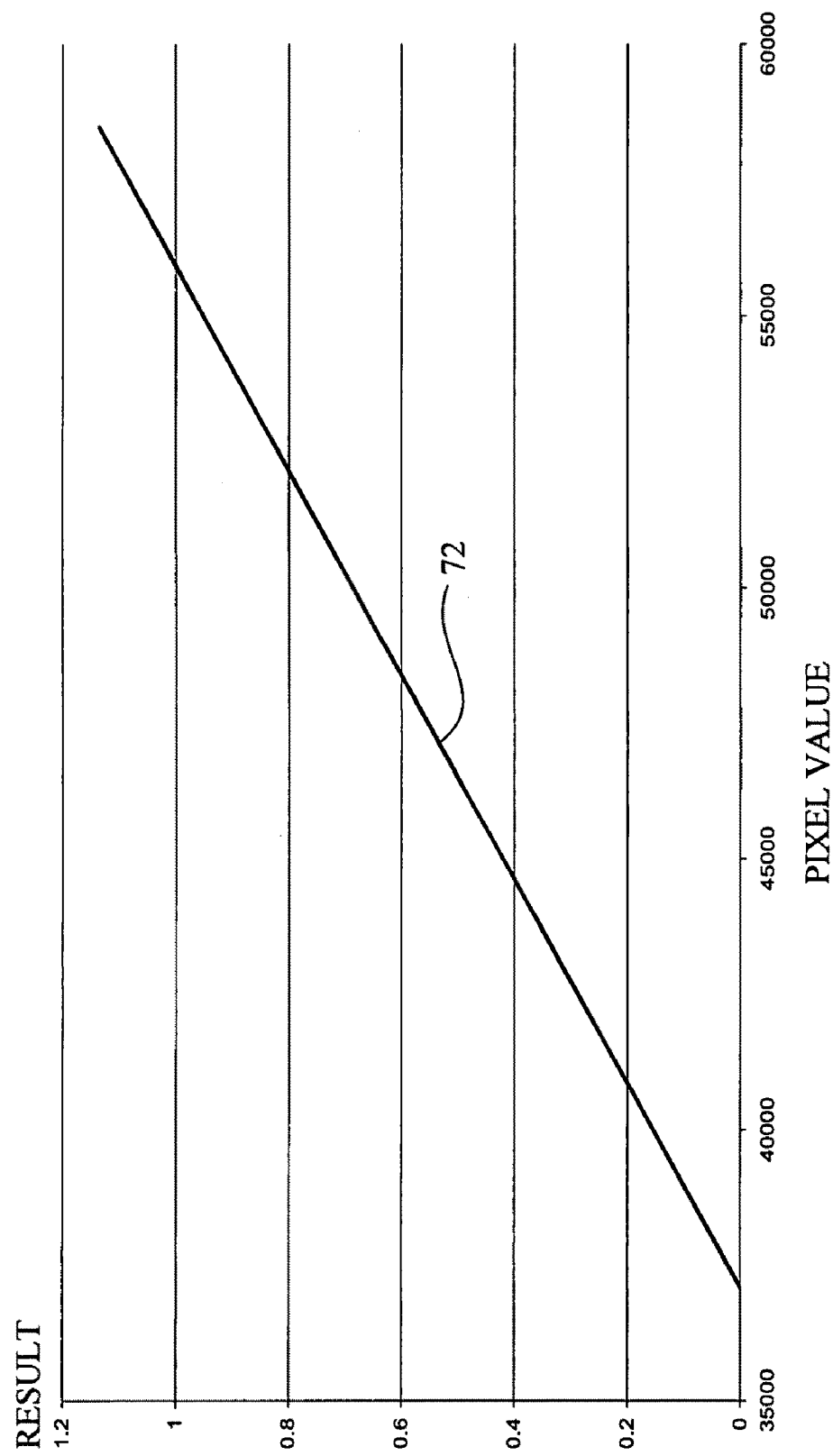
FIG. 11 shows a plot of the result of the left side of Equation 2 as a function of pixel value.

The predetermined threshold $T_3$ may be a constant empirically derived threshold. For example, FIG. 11 shows a plot of the result of the left side of Equation 2 as a function of pixel value as it moves from the minimum to maximum and keeping the average constant, as represented by line 72. In this example, line 72 is plotted using the same set of data shown in FIG. 5; however, in practice an average or otherwise "bad" representative data set may be used. The maximum value of line 72 (about 1.14) represents the maximum pixel value in the data set. Where line 72 equals one represents the average of the data set, and where line 72 equals zero represents the minimum. With a near perfect data set (i.e., one in which the maximum and minimum are very close together), the slope of line 72 will be very, very large. In this example, threshold $T_3$ is less than one, so as to ensure that no data points greater than the average (which by definition can not be contaminated) will be excluded.

Figure 12:
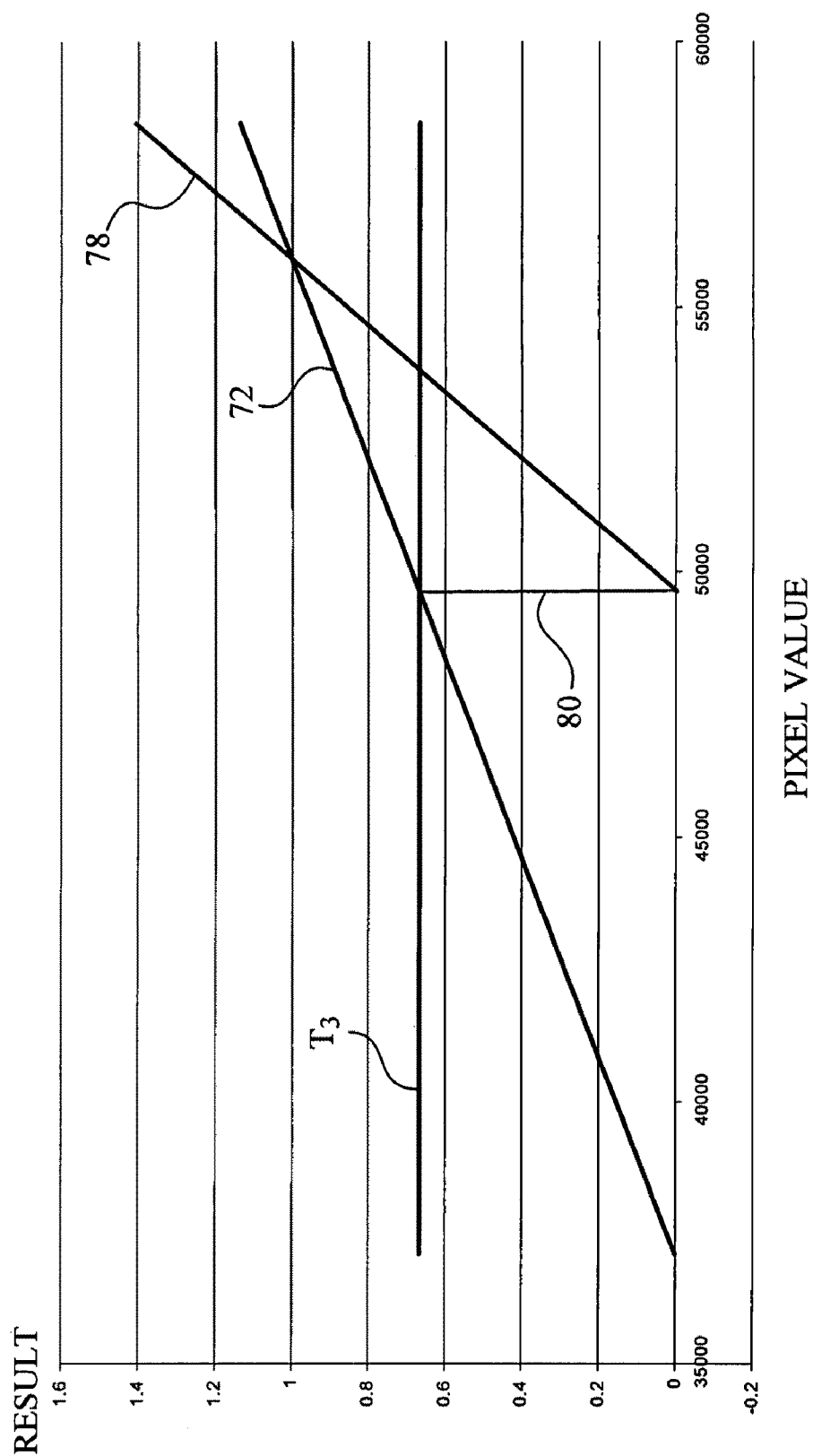
FIG. 12 shows a graphical technique used in determining a threshold $T_3$ for removing calibration data samples corresponding to a region of calibration target contamination.

Referring to FIG. 12, in order to determine threshold $T_3$, however, more than just the representative bad data set with contamination (line 72) is plotted, and thus a representative "good" data set without contamination (line 78) is plotted in the same way, and on the same graph. Now it is a matter of finding the geometric projection of the line 78, having an edge 80, plotted from the "good" set onto the line 72 plotted from the "bad" set. The intersection of projection edge 80 with line 72 identifies threshold $T_3$, which in this example threshold $T_3$=0.667.

In order to reduce the complexity of the calculation of Equation 2 for implementation into the firmware of scanner 24, e.g., in controller 18, a simplified alternate equation, Equation $2_{alt}$, may be used, as follows:

$$P_{ji} < T_4, \text{ where } T_4 = P_{j\,min} + (\overline{P}_j - P_{j\,min}) \times T_3. \qquad \text{Equation } 2_{alt}:$$

Figure 13:
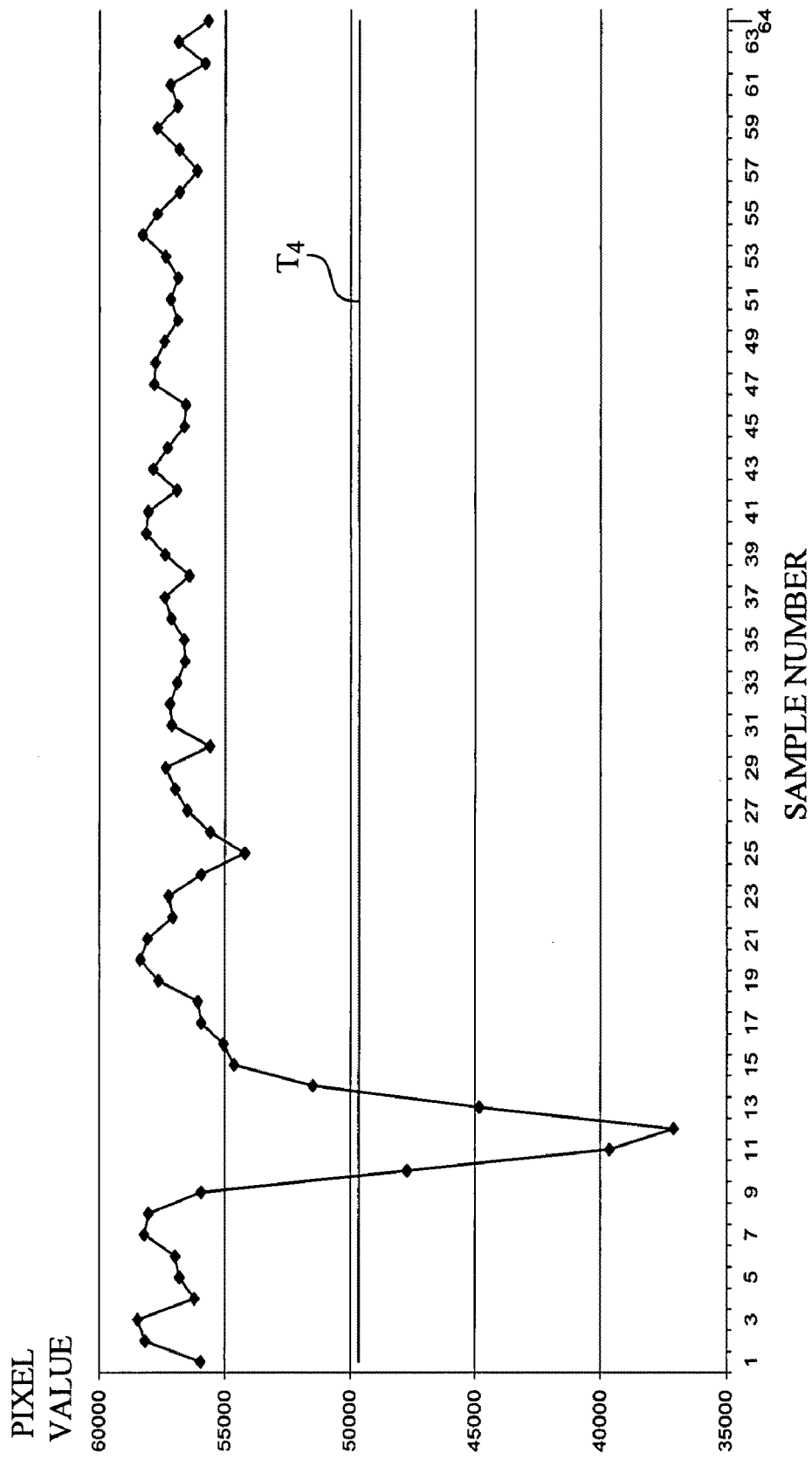
FIG. 13 is a graph showing the same calibration data set used in determining threshold $T_3$, with threshold $T_3$ converted to an alternate threshold $T_4$.

FIG. 13 shows the same calibration data set used in determining threshold T3, with threshold T3 converted to an alternate threshold $T_4$, for use in Equation 2alt. In the example of FIG. 13, the pixel values may range from 35,000 to 60,000, and actual data points for the respective samples 1-64 are shown by diamond-shaped dots. All values less than threshold $T_4$ will be removed from the calibration process.

Figure 14:
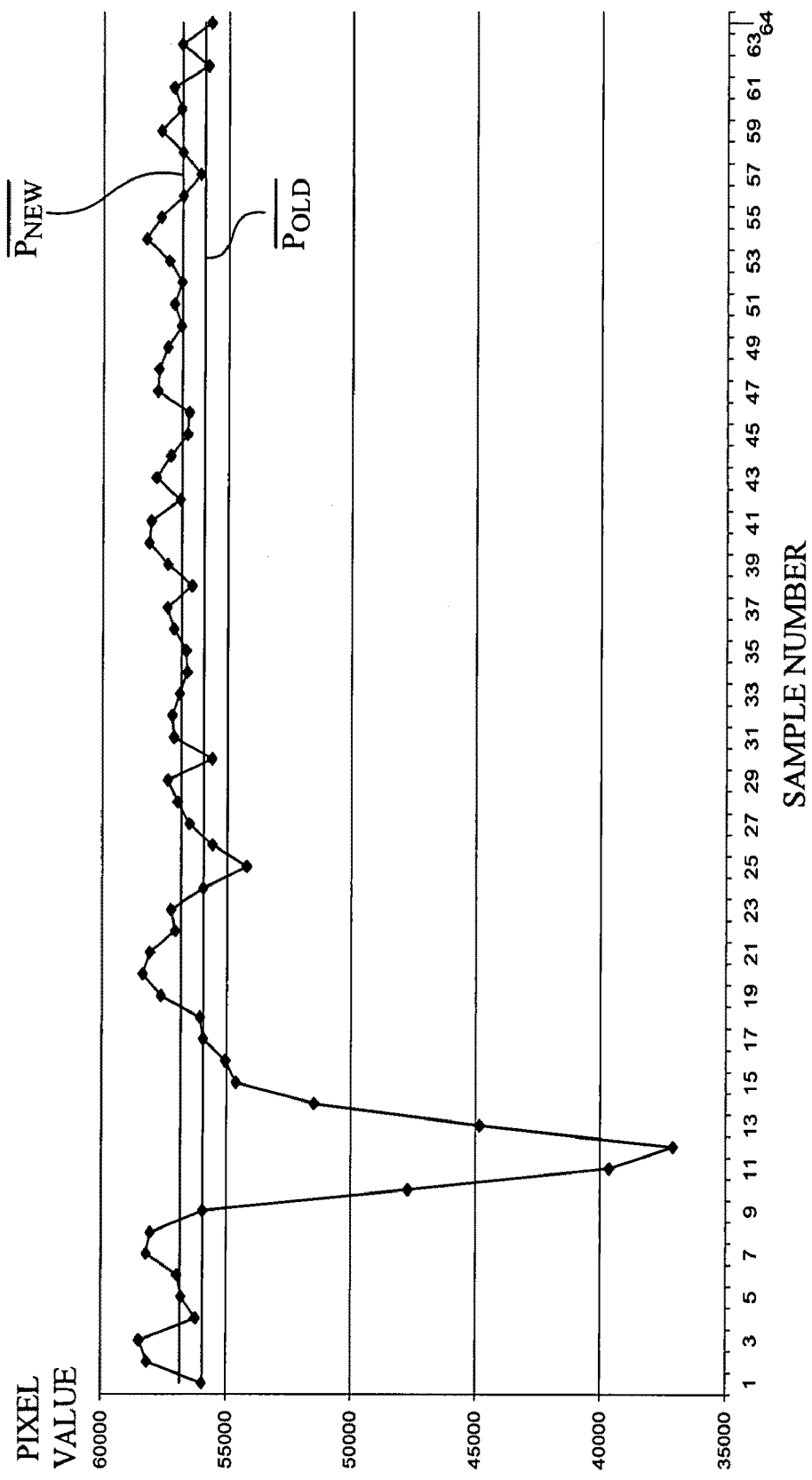
FIG. 14 is a graph illustrating a resulting new average $\overline{Pnew}$ for the set of data after removing samples having a value less than threshold $T_4$.

A resulting new average $\overline{Pnew}$ for the set of data is shown in FIG. 14, along with the original average $\overline{Pold}$. In the example of FIG. 14, the pixel values may range from 35,000 to 60,000, and actual data points for the respective samples 1-64 are shown by diamond-shaped dots.

Figure 15A:
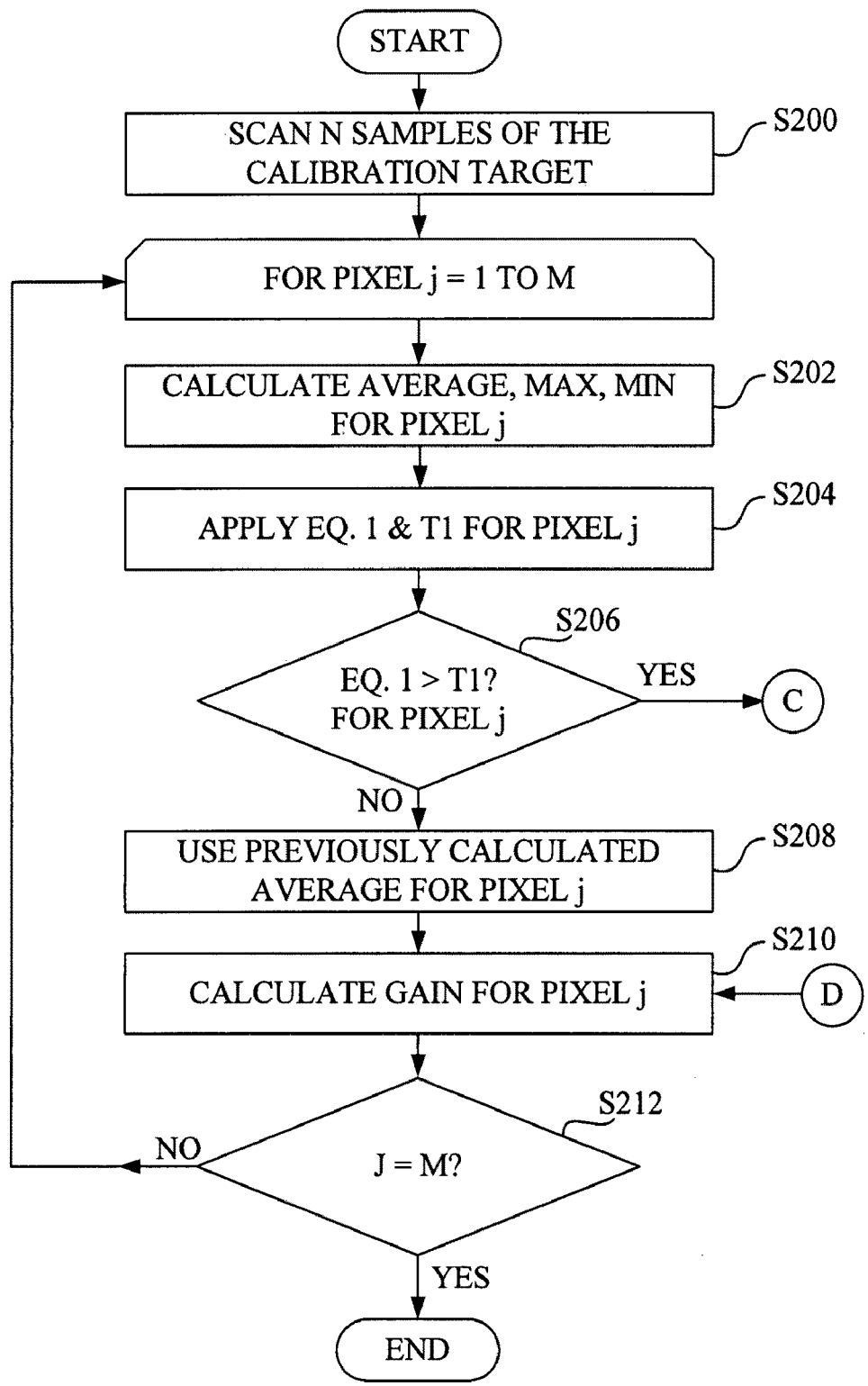
FIGS. 15A and 15B form a flowchart of an alternative representation of a method for compensating for a contaminated calibration target used in calibrating a scanner having a plurality of sensor pixels, in accordance with an embodiment of the present invention.
Figure 15B:
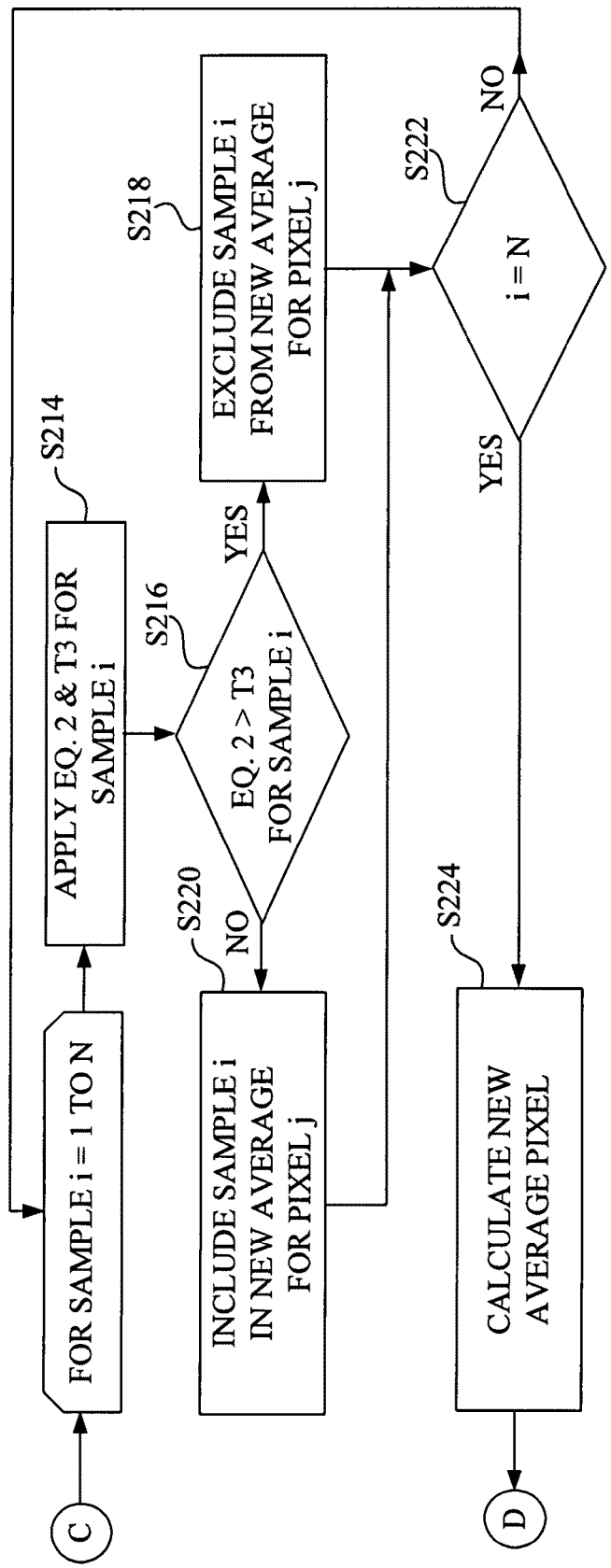

FIGS. 15A and 15B form a flowchart of an alternative representation of a method for compensating for a contaminated calibration target used in calibrating a scanner having a plurality of sensor pixels, in accordance with an embodiment of the present invention.

At act S200, N calibration data samples are collected based on a scanning of calibration target 58.

At act S202, for pixels j=1 through M of the plurality of sensor pixels 56, an average, maximum and a minimum calibration value is calculated.

At act S204, for pixels j=1 through M of the plurality of sensor pixels 56, Equation 1 and threshold T1 is applied using the values determined at act S202.

At act S206, for pixels j=1 through M of the plurality of sensor pixels 56, it is determined whether the value calculated from Equation 1 is greater than threshold T1.

If the determination at act S206 is NO, then at act S208 the previously calculated calibration data average for pixel j is used.

At act S210, the gain for pixel j is calculated (see also FIG. 6). The determined gain values may be applied to pixel gain/offset circuit 54 for use in calibrating the respective outputs of the plurality of sensor pixels 56 of image sensor 52 of scanner 24.

At act S212, if the determination is NO, i.e., not all pixels j=1 through M have been processed, then the process return to act S202 for the next pixel j. If at act S212 the determination is YES, i.e., all sensor pixels j=1 through M have been processed, then the process ends.

Referring back to act S206, if the determination is YES, then at act S214 (FIG. 15B) Equation 2 and threshold T3 are applied to each calibration data sample i=1 to N.

At act S216, for each sample i=1 to N, it is determined whether the value calculated from Equation 2 is greater than threshold T3.

If the determination at act S216 is YES for one or more of the calibration data samples, then at act S218 the calibration data samples for which the determination is YES are excluded from a new calibration data average of samples for sensor pixel j.

If the determination at act 216 is NO for one or more samples, then at act S220 the samples for which the determination is NO are included in the new calibration data average of the calibration data samples for sensor pixel j.

At act S222, it is determined whether all samples have been process. If the determination is NO, then the process returns to repeat acts S214 and S216, and one of acts S218 and S220. If the determination is YES, then the process proceeds to act S224.

At act S224, after all calibration data samples have been processed, then a new calibration data average is calculated, and the process returns to act S210 for calculating a gain of sensor pixel j.

The foregoing description of a method and an embodiment of the invention have been presented for purposes of illustration. It is not intended to be exhaustive or to limit the invention to the precise steps, acts and/or forms disclosed, and obviously many modifications and variations are possible in light of the above teaching. It is intended that the scope of the invention be defined by the claims appended hereto.

What is claimed is:

1. A method for compensating for a contaminated calibration target used in calibrating a scanner having a plurality of sensor pixels, said method comprising:
   (a) scanning a calibration target to generate a respective plurality of calibration data samples for each sensor pixel of said plurality of sensor pixels;
   (b) for said respective plurality of calibration data samples associated with a current sensor pixel of said plurality of sensor pixels, removing any calibration data sample that corresponds to a region of calibration target contamination on said calibration target, leaving filtered calibration data samples;
   (c) determining a gain value for said current sensor pixel based on said filtered calibration data samples;
   (d) repeating acts (b) and (c) for a next sensor pixel of said plurality of sensor pixels until a respective gain value is determined for each of said plurality of sensor pixels; and
   (e) applying the determined gain values to said plurality of sensor pixels for use in subsequent image scanning by said scanner.

2. The method of claim 1, wherein said calibration target without any contamination in a uniform neutral tone, and wherein said region of calibration target contamination includes at least one imperfection in at least one of uniformity and neutrality of said calibration target.

3. The method of claim 2, said uniform neutral tone of said calibration target being any single tone adhering to the equations luminance L*>TL and chrominance a* & b*<Tab as defined by CIELAB color space, where TL is a predetermined luminance threshold and Tab is a predetermined chrominance threshold.

4. The method of claim 1, wherein prior to said removing of act (b), the method further comprising:
   determining a maximum calibration value of said respective plurality of calibration data samples;
   determining a minimum calibration value of said respective plurality of calibration data samples;
   determining an average calibration value of said plurality of calibration data samples;
   determining a threshold; and
   determining an existence of said region of calibration target contamination of said calibration target based on mathematical relationship among said maximum calibration value, said minimum calibration value, said average calibration value, and said threshold.

5. The method of claim 4, wherein said predetermined Threshold is a constant empirically derived threshold.

6. The method of claim 1, wherein said removing of act (b) includes:
   (b1) identifying a minimum calibration value of said respective plurality of calibration data samples;
   (b2) identifying an average calibration value of said respective plurality of calibration data samples;
   (b3) determining a first difference between a current calibration value of a current calibration sample of said respective plurality of calibration data samples and said minimum calibration value;
   (b4) determining a second difference between said average calibration value and said minimum calibration value;
   (b5) forming a ratio of said first difference and said second difference;
   (b6) if said ratio is less than a predetermined threshold, then designating said current calibration value as corresponding to said region of calibration target contamination;

(b7) repeating acts hi through b6 for each calibration data sample of said respective plurality of calibration data samples; and (b8) removing any calibration data sample corresponding to said region of calibration target contamination, leaving said filtered calibration data samples.

7. The method of claim 6, wherein said predetermined threshold is a constant empirically derived threshold.

8. The method of claim 1, wherein said scanner is incorporated into an imaging apparatus.

9. A method for compensating for a contaminated calibration target used in calibrating a scanner having a plurality of sensor pixels, said method comprising:

(a) scanning a calibration target to generate a respective plurality of calibration data samples for each sensor pixel of said plurality of sensor pixels;

(b) processing said respective plurality of calibration data samples associated with a current sensor pixel of said plurality of sensor pixels to determine whether there is a region of calibration target contamination associated with said current sensor pixel;

(c) filtering said respective plurality of calibration data samples to remove any calibration data sample corresponding to said region of calibration target contamination, leaving filtered calibration data samples;

(d) determining a gain value for said current sensor pixel based on said filtered calibration data samples;

(e) repeating acts (b) through (d) for a next sensor pixel of said plurality of sensor pixels until a respective gain value is determined for each of said plurality of sensor pixels; and (f) applying the determined gain values to said plurality of sensor pixels for use in subsequent image scanning by said scanner.

10. The method of claim 9, wherein said calibration target without any contamination in a uniform neutral tone, and wherein said region of calibration target contamination includes at least one imperfection in at least one of uniformity and neutrality of said calibration target.

11. The method of claim 10, said uniform neutral tone of said calibration target being any single tone adhering to the equations luminance $L^* > TL$ and chrominance $a^*$ & $b^* < Tab$ as defined by CIELAB color space where TL is a predetermined luminance threshold and Tab is a predetermined chrominance threshold.

12. The method of claim 9, wherein said processing of act (b) includes:

determining a maximum calibration value of said respective plurality of calibration data samples;

determining a minimum calibration value of said respective plurality of calibration data samples;

determining an average calibration value of said plurality of calibration data samples;

determining a first difference between said average calibration value and said minimum calibration value;

determining a second difference between said average calibration value and said maximum calibration value;

forming a ratio of said first difference and staid second difference; and if said ratio exceeds a predetermined threshold, then designating said calibration target as having said region of calibration target contamination.

13. The method of claim 12, wherein said predetermined threshold is a constant empirically derived threshold.

14. The method of claim 9, wherein said filtering of act (c) includes:

(c1) identifying a minimum calibration value of said respective plurality of calibration data samples;

(c2) identifying an average calibration value of said respective plurality of calibration data samples;

(c3) determining a first difference between a current calibration value of a current calibration sample of said respective plurality of calibration data samples and said minimum calibration value;

(c4) determining a second difference between said average calibration value and said minimum calibration value;

(c5) forming a ratio of said first difference and said second difference;

(c6) if said ratio is less than a predetermined threshold, then designating said current calibration value as corresponding to said region of calibration target contamination;

(c7) repeating acts c6 through c6 for each calibration data sample of said respective plurality of calibration data samples; and (c8) removing any calibration data sample corresponding to said region of calibration target contamination, leaving said filtered calibration data samples.

15. The method of claim 14, wherein said predetermined threshold is a constant empirically derived threshold.

16. The method of claim 9, wherein said scanner is incorporated into an imaging apparatus.

17. A method for compensating for a contaminated calibration target used in calibrating a scanner having a plurality of sensor pixels, said method comprising:

(a) scanning a calibration target to generate a respective plurality of calibration data samples for each sensor pixel of said plurality of sensor pixels;

(b) determining a maximum calibration value of said respective plurality of calibration data samples;

(c) determining a minimum calibration value of said respective plurality of calibration data samples;

(d) determining an average calibration value of said plurality of calibration data samples;

(e) determining a first difference between said average calibration value and said minimum calibration value;

(f) determining a second difference between said average calibration value and said maximum calibration value;

(g) forming a first ratio of said first difference and said second difference, and if said first ratio exceeds a first predetermined threshold, then designating said calibration target as having a region of calibration target contamination associated with said current pixel;

(h) determining a third reference between a current calibration value of a current calibration sample of said respective plurality of calibration data samples and said minimum calibration value;

(i) forming a second ratio of said third difference and said first difference, and if said second ratio is less than a second predetermined threshold, then designating said current calibration value as corresponding to said region of calibration target contamination;

(j) repeating acts (H) and (i) for each calibration data sample of said respective plurality of calibration data samples for said current sensor pixel;

(k) removing any calibration data sample corresponding to said region of calibration target contamination, leaving filtered calibration data samples;

(l) forming a new average calibration value from said filtered calibration data samples;

(m) determining a gain value for said current sensor pixel based on said new average calibration value for said current pixel;

(n) repeating acts (b) through (m) for a next sensor pixel of said plurality of sensor pixels until a respective gain value is determined for each of said plurality of sensor pixels; and (o) applying the determined gain values to said plurality of sensor pixels for use in subsequent image scanning by said scanner.

18. The method of claim 17, wherein said calibration target without any contamination is a uniform neutral tone, and wherein said region of calibration target contamination includes at least one imperfection in at least one of uniformity and neutrality of said calibration target.

19. The method of claim 18, said uniform neutral tone of said calibration target being any single tone adhering to the equations luminance $L^* > TL$ and chrominance $a^*$ & $b^* < Tab$ as defined in CIELAB color space, where TL is a predetermined luminance threshold and Tab is a predetermined chrominance threshold.

20. The method of claim 17, wherein h of said first predetermined threshold and said second predetermined threshold is a constant empirically derived threshold.

21. A method for compensating for a contaminated calibration target used in calibrating a scanner having a plurality of sensor pixels, said method comprising:

(a) scanning a calibration target to generate a respective plurality of calibration data samples for each sensor pixel of said plurality of sensor pixels;

(b) determining a maximum calibration value of said respective plurality of calibration data samples;

(c) determining a minimum calibration value of said respective plurality of calibration data samples;

(d) determining an average calibration value of said plurality of calibration data samples;

(e) determining a first difference between said average calibration value and said minimum calibration value;

(f) determining a second difference between said average calibration value and said maximum calibration value;

(g) forming a first ratio of said first difference and said second difference, and if said first ratio exceeds a first predetermined threshold, then designating said calibration target as having a region of calibration target contamination associated with said current sensor pixel;

(h) removing any calibration data sample corresponding to said region of calibration target contamination, leaving filtered data samples; and (i) determining a gain value for said current sensor pixel based on said filtered data samples; and (j) applying the determined gain value to said current sensor pixel for use in subsequent image scanning by said scanner.

22. The method of claim 21, further comprising:

repeating acts (b) through (i) for a next sensor pixel of said plurality of sensor pixels until a respective gain value is determined for each of said plurality of sensor pixels; and applying the determined gain values to said plurality of sensor pixels for use in subsequent image scanning by said scanner.

23. A method for compensating for a contaminated calibration target used in calibrating a scanner having a plurality of sensor pixels, said method comprising:

(a) scanning a calibration target to generate a respective plurality of calibration data samples for each sensor pixel of said plurality of sensor pixels;

(b) determining a maximum calibration value of said respective plurality of calibration data samples;

(c) determining a minimum calibration value of said respective plurality of calibration data samples;

(d) determining an average calibration value of said plurality of calibration data samples;

(e) determining a first difference between said average calibration value and said minimum calibration value;

(f) determining a second difference between a current calibration value of a current calibration sample of said respective plurality of calibration data samples and said minimum calibration value (g) forming a first ratio of said second difference and said first difference, and if said first ratio is less than a first predetermined threshold, then designating said current calibration value as corresponding to a region of calibration target contamination; and (h) removing any calibration data sample corresponding to said region of calibration target contamination, leaving filtered data samples; and (i) determining a gain value for said current sensor pixel based on said filtered data samples; and (j) applying the determined gain value to said current sensor pixel for use in subsequent image scanning by said scanner.

* * * * *